United States Patent
Bradley

[15] 3,707,231
[45] Dec. 26, 1972

[54] TWO-STAGE FLUID TREATMENT SYSTEM

[72] Inventor: William E. Bradley, New Hope, Pa.
[73] Assignee: Puredesal, Inc., Levittown, Pa.
[22] Filed: Jan. 25, 1971
[21] Appl. No.: 109,476

[52] U.S. Cl..................................210/98, 210/321
[51] Int. Cl. ...............................................B01d 31/00
[58] Field of Search............210/22, 23, 321, 137, 98

[56] References Cited

UNITED STATES PATENTS

| | | | |
|---|---|---|---|
| 3,532,621 | 10/1970 | Hough | 210/22 |
| 3,562,152 | 2/1971 | Davison | 210/22 |
| 3,405,058 | 10/1968 | Miller | 210/23 |
| 3,130,156 | 4/1964 | Neff | 210/22 X |
| 3,228,877 | 1/1966 | Mahon | 210/22 |
| 3,498,910 | 3/1970 | Mendelson | 210/321 X |
| 3,617,547 | 11/1971 | Halff | 210/321 |

Primary Examiner—Frank A. Spear, Jr.
Attorney—Thomas M. Ferrill, Jr. and Roger Norman Coe

[57] ABSTRACT

Liquid purification is accomplished by adjusting osmotic pressure using two semi-permeable membranes and an intermediate fluid circulated between the two membranes. One of the membranes is operated as a direct absorption membrane at low pressure, whereas reverse osmosis is accomplished at the other membrane under high pressure.

16 Claims, 1 Drawing Figure

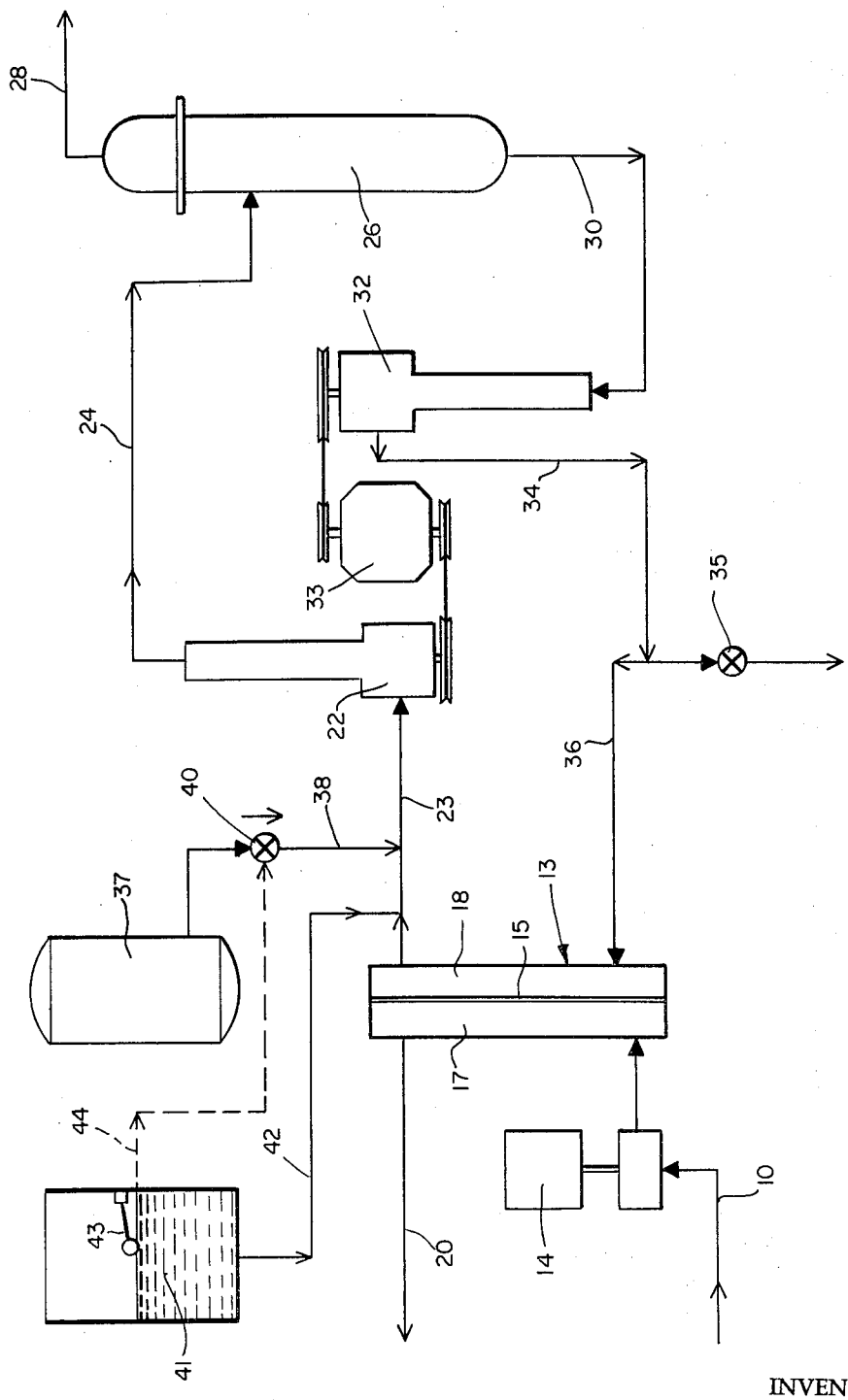

TWO-STAGE FLUID TREATMENT SYSTEM

BACKGROUND OF THE INVENTION

The present invention relates to a two-stage fluid treatment system and more particularly, to a two-stage fluid treatment system employing both direct osmosis, reverse osmosis and an intermediate fluid to effect the purification of a liquid fluid material.

In recent years increasing attention has been directed to the discovery of methods of converting impure liquid fluids, such as polluted, saline and brackish water, into pure liquid at a reasonable cost. One of the most promising methods which has been studied is the reverse osmosis system. The reverse osmosis system makes use of the characteristic behavior of solutions diffusing through a membrane according to the phenomenon of osmosis. For example, it is well known that if a salty solution is divided from less salty solution by an osmotic membrane which is impermeable to salt but not to water, water passes through the membrane into the more salty solution, tending to equalize the salinity on both sides of the membrane. This membrane process can be reversed by applying to the more concentrated solution a mechanical pressure greater than the osmotic pressure acting upon the water. That is, the "reverse osmosis" forces water with a small amount of dissolved solids to pass through or permeate the membrane out of the salty solution, while the membrane holds back the salt ions. The rate of permeation is directly related to the membrane constant, the area of the membrane, and the excess of pressure employed above osmotic pressure and inversely related to the thickness of the membrane. Thus, a polymer membrane of high permeability, high selectivity, high stability and long life is of prime importance. Since there is no phase change required for a reverse osmosis process and the process is relatively simple to use, it is the lowest cost process available for desalting water.

Unfortunately, reverse osmosis treatment systems intended to purify and desalinate polluted water, brackish water or sea water frequently fail in operation because of membrane fouling caused by biological and/or chemical deposits. Flushing or washing of a reverse osmosis membrane fails to provide a complete solution to membrane fouling because of the relatively inaccessible location of the membrane inside a pressure vessel. Moreover, in the case of sea water, biological and biochemical deposits tend to form not only on the membrane of such systems, but in the pumps, pipes and pressure vessels throughout the system. For example, sea water, containing on the average about 35,000 parts per million of dissolved salts, generally has small amounts of many salts other than sodium chloride, including: approximately 3,807 parts per million of magnesium chloride; approximately 1,658 parts per million of magnesium sulfate, approximately 1,260 parts per million of calcium sulfate; approximately 863 parts per million of potassium sulfate; approximately 123 parts per million of calcium carbonate; and approximately 76 parts per million of magnesium bromide. Any water less salty than sea water but containing more than a thousand parts per million of dissolved salts is normally defined as being brackish. Fresh water is normally defined as water containing less than a thousand parts per million of dissolved salts, although according to U.S. Public Health Service standards drinking water should preferably contain less than 500 parts per million of dissolved salts. It has been found that a conventional reverse osmosis system can be operated for more than a year without attention only when the system is fed with well water or extremely well filtered water free of all biological contamination and turbidity.

An additional problem found in reverse osmosis systems is that such systems are susceptible to passing contaminants through minute holes or leaks in the membranes employed because of the pressure under which such systems must be operated.

SUMMARY OF THE INVENTION

An object of the present invention is to provide a fluid treatment system for converting impure liquid fluid into pure liquid which is economically practical to construct and install.

Another object of the present invention is to provide a fluid treatment system for converting impure liquid fluid into pure liquid which requires low maintenance even when treating liquid fluid which is turbid and contains biological contamination.

Another object of the present invention is to protect a reverse osmosis fluid purification system from fouling or clogging by large organic molecules, colloidal suspended particles or living microorganisms.

Yet another object of the present invention is to operate the first membrane of a two-stage fluid purification system with the hydrostatic pressure difference across the said first membrane opposite to the direction of fluid flow through that membrane; thus any leak or defective portion of the membrane will not admit bacteria, virus or particulate matter from the untreated fluid into the interstage fluid and protection is assured against transmission of pollutants to the system output.

Still another object of the present invention is the utilization of high performance semi-permeable membranes which are unable to sustain a hydrostatic pressure comparable to osmotic pressure of the untreated fluid without deterioration.

With these and other objects in mind, the two-stage fluid treatment system of the present invention involves the use of two semi-permeable membranes and an intermediate fluid circulated between said two membranes. The raw, untreated liquid fluid is introduced to the first semi-permeable membrane which is operated as a direct absorption membrane. Membrane compaction is avoided by operating this first membrane at near zero pressure differential. Accordingly, the raw, untreated liquid side of the first membrane is readily exposed for cleaning, chemical treatment and/or turbulent flow designed to overcome membrane fouling difficulties. An intermediate fluid is circulated rapidly on the opposite side of the first membrane and is so selected as to facilitate osmosis of the liquid fluid to be treated through the first membrane; the intermediate fluid being substantially unable to penetrate that membrane. A high pressure pump transfers the intermediate fluid together with the fluid passing through the first membrane to the second membrane which is operated under reverse osmosis conditions. To stabilize the pressure generated by the high pressure pump, a spring-loaded relief valve may be used returning fluid to the pump input from the pump output so long as the pressure exceeds a predetermined value. Alternatively, a pump generating substantially constant pressure over the intended range of fluid flow rates may be used. The second membrane which is substantially impermeable to the intermediate fluid passes the desired treated liquid fluid, while retaining the intermediate fluid which is eventually recirculated to the first membrane.

BRIEF DESCRIPTION OF THE DRAWING

Other and further objects, advantages, and features of the invention will be apparent to those skilled in the art from the following detailed description thereof, taken in conjunction with the accompanying drawing which is a diagrammatic illustration of an embodiment of the present invention.

DESCRIPTION OF THE PREFERRED EMBODIMENTS

Referring to the drawing, raw, untreated liquid fluid in conduit 10 is passed through vessel 13 by means of circulating pump 14. Vessel 13 is, in fact, a four-terminal permeator having a low pressure direct osmosis membrane 15 which is exposed to the raw untreated liquid fluid from conduit 10 on one side in chamber 17 and to an intermediate fluid on the other side in chamber 18. Due to the osmotic pressure difference generated by the two fluids on opposite sides of membrane 15 liquid fluid in chamber 17 is drawn through membrane 15 into chamber 18. The remaining raw untreated liquid fluid in chamber 17 is discharged through conduit 20. Thus, the present system exposes raw, untreated liquid fluid, such as sea water, to a bare minimum of equipment under low pressure and at such other conditions as to avoid the formation of substantial deposits on membrane 15. It will be understood that the input liquid fluid to conduit 10 may be pretreated by the addition of chemicals to inhibit precipitation of calcium and other polyvalent cations, that the pH of said fluid may be adjusted and that a filter may be used to remove undissolved solids which have a diameter over a particular size, e.g., over about 10 microns.

The intermediate fluid is continuously circulated by a high pressure pump 22 which draws the intermediate fluid from chamber 18 of vessel 13 through conduit 23 and passes said fluid through conduit 24 under high pressure into permeator 26. High pressure pump 22 produces sufficient pressure in permeator 26 to cause reverse osmosis to occur and treated fluid to pass through the membrane inside permeator 26 into conduit 28. The resulting fluid emerging from permeator 26 in conduit 28 is substantially purified as compared with both the raw untreated fluid in conduit 10 and the initially treated liquid fluid in conduit 24. Reject fluid from permeator 26, including the intermediate fluid, passes through conduit 30 back to chamber 18 of four-terminal permeator 13. The pressure of the intermediate fluid in conduit 30 is adjusted by suitable means prior to transmitting said fluid back through conduits 34 and 36 to the low pressure direct osmosis membrane in permeator 13. A positive displacement hydraulic motor 32 is illustrated in the drawing as the preferred means of maintaining high pressure in permeator 26 and low pressure in permeator 13. In addition, the high pressure positive displacement hydraulic motor 32 effectively recovers the energy of decompression of the intermediate fluid passing from permeator 26 to permeator 13. Positive displacement hydraulic motor 32 is suitable belted or geared to electric motor 33 and to the high pressure pump 22, thereby recovering not only the energy of decompression but also controlling the rate of flow between permeators 26 and 13. While it is preferred that the input pump and output hydraulic motor be geared together by means of a pulley, gears or other suitable means to an electric motor which is operated at a fixed or variable speed in order to maintain the required pressure for the reverse osmosis liquid treatment system, both the input pump and output hydraulic motor can be driven by separate electric motors, such as synchronous motors or induction motors or direct current electrical machines, whereby a predetermined ratio of flow between the two is maintained and decompression energy recovered. The electrical machine connected to the hydraulic motor thus operates as an electric generator.

The high pressure pump 22 may be a constant pressure, variable flow pump, such as a multi-stage high speed centrifugal pump, or alternatively a positive displacement pump shunted by a spring-loaded pressure regulation valve. In fact, the preferred high pressure pump 22 is a self-priming, positive displacement pump, which operates like a precision screw conveyor with a rotor turning inside a stator. A compression fit exists in the rotor and stator so that as the rotor turns within the stator cavities are formed which progress toward the discharge end of the pump. The advantages of this type of pump include the fact that it is capable of handling all fluids with a minimum of turbulence, agitation and pulsation; that it is essentially self-cleaning; and that it can readily be made corrosion resistant. In place of hydraulic motor 32, which may be a positive displacement pump operated in reverse, a simple valve can be used which is designed to be closed unless the pressure across it in the direction from permeator 26 to permeator 13 is such that it exceeds a predetermined value. When that predetermined value is reached a spring or other suitable mechanism would release the valve, thus maintaining a pressure in permeator 26 which is sufficient to drive treated fluid through the membrane of the permeator 26 against the osmotic pressure caused by the intermediate fluid. Accordingly, during normal operation such a valve would be forced open by the flow generated by pump 22 and the flow through the valve would adjust itself to be equal to the difference between the flow through high pressure pump 22 and that through conduit 28. In any event, it is desirable to have an over-pressure relief valve, such as valve 35, in order to assure a desired pressure level in permeator 13.

The amount and concentration of the intermediate fluid can be regulated by the addition of makeup intermediate fluid from a container 37 through conduit 38 to conduit 23. This addition of makeup intermediate fluid is controlled by regulating valve 40, which may open automatically in response to the fall of pressure or volume of the intermediate fluid, thereby introducing a concentrate of intermediate fluid, increasing osmotic pressure and therefor flow through membrane 15.

In a preferred embodiment of the invention, untreated water is introduced through conduit 10 to chamber 17 of permeator 13. In passing through permeator 13, the untreated water is circulated adjacent to the outer surface of osmotic membrane 15, which is so configured that only its outer surface is accessible to the untreated water. The inner surface of the same membrane is exposed to a separate stream of water containing as an intermediate solute magnesium sulfate which does not readily pass through the membrane because of large hydration groups formed around the divalent ions and because of the charges on the ions. The intermediate fluid comprising an aqueous solution of magnesium sulfate has two major functions: (1) drawing water by osmosis through absorption membrane 15 from the water supply into the intermediate fluid, thereby tending to dilute the intermediate fluid and (2) serving as a source of water for the reverse osmosis desalination sub-system in permeator 26. The reverse osmosis system extracts water of greatly reduced salinity from the intermediate fluid, concentrating the intermediate fluid in its reject stream in conduit 30 and delivering the desalinated water from its permeate output terminal into conduit 28. The concentrated reject stream from the reverse osmosis system contains almost all of the magnesium sulfate and is returned to the input terminal of the absorption apparatus, viz., permeator 13. In this preferred embodiment, the reject ratio of permeator 26 is such that the reject stream in conduit 30 is at least half, and up to 8/10, of the input flow in conduit 24 to the permeator 26.

It will be seen that the concentration of the magnesium sulfate in the intermediate fluid determines the rate at which water is drawn through the absorption membrane 15 from the untreated water in chamber 17 into the intermediate fluid in chamber 18. If the concentration of the magnesium sulfate is too great, excessive imbibing of water through the membrane into the intermediate fluid will cause the volume of the water in the intermediate fluid to exceed that lost in the treated water output, conduit 28 so that the pressure and/or volume of intermediate fluid will increase. On the other hand, if the concentration of the magnesium sulfate is insufficient, then the reverse osmosis system will extract water from the intermediate fluid at a rate faster than it is replaced through the absorption membrane 15 and the pressure and/or volume of intermediate fluid will decrease. Automatic regulation of valves 35 and 40 in accordance with the volume, or the pressure, of the intermediate fluid is used to maintain the concentration at the desired level. Pressure of the intermediate fluid lower than a predetermined value causes check valve 40 to open allowing concentrated magnesium sulfate solution to enter from reservoir 37. A reservoir, such as reservoir 41, can be used to supply a small, almost continuous "make up" flow of intermediate fluid into the system through conduit 42. A valve 43, such as a float valve, in reservoir 41 can be interconnected to valve 40 by means of line 44.

A common form of permeator, which can be used in the present invention for permeator 26 is a shell and tube configuration similar to a single end heat exchanger in which hollow fibers, employed as membranes, are housed. These fibers are potted or encapsulated in an epoxy resin at one end. Generally, permeators for liquid purification or desalinization by reverse osmosis have only three pipe connections: namely, an input connection or feed connection through which untreated liquid enters at high pressure, a reject output for liquid emerging from the permeator at high pressure, and a permeate output connection from which purified and/or desalinated liquid emerges at a low positive pressure. In one typical embodiment, the reject liquid in conduit 30 emerges at substantially the inlet pressure, which can be of the order of about 600 pounds per square inch.

Inside the permeator, the flow of liquid through the shell is preferably generally transverse to the flow of the permeate or product liquid inside the hollow fibers, e.g., hollow nylon fibers. In conventional operation, product liquid permeates through the walls of the hollow fibers inside the permeator and travels along the interior of the fibers through a bulkhead into a permeate output section. The portion of the feed solution which fails to permeate through the hollow fibers is continuously discharged from the exit port in the body.

The first permeator 13 may resemble a double ended heat exchanger with hollow fibers encapsulated in epoxy resin bulkheads at both ends, in which case the permeator may have four terminals: (1) an entrance port for untreated fluid to the outer shell through which the hollow fibers pass, (2) an exit port from the outer shell, (3) an entrance port to the hollow fiber interiors at one end, and (4) an exit port from the hollow fibers at the other end.

Membrane 15 in permeator 13 is a selective membrane which will transmit the desired fluid material but which discriminates against dissolved salts, large molecules, ions, and biological materials. One example of such a membrane is cellulose acetate cast from an acetone solution containing approximately two percent magnesium perchlorate and which is subsequently heat treated by soaking in hot water at approximately 80° C. Other suitable membranes include nylon, aromatic polyamide membranes and cupric ferrocyanide colloidal film. The membrane in permeator 26 must of course be able to withstand high hydrostatic pressure differences and be able to transmit the desired fluid readily. Said membrane need not be selective against the impurities removed by the first membrane. Of course, both membranes must be selective against the intermediate fluid.

It is to be understood that the drawing illustrates membrane 15 in a highly schematic fashion. Actually, the semi-permeable membrane of permeator 13 and the semi-permeable membrane of permeator 26 can take a variety of forms. A preferred form is one in which the membranes are tubular, with the diameter of each tube, the wall thickness and the length of each tube selected for optimum performance for each portion of the system. It is often advantageous to apply a very thin grid, such as a coating, to the membrane material. Use of such a grid can extend the useful life of the membranes employed.

A convenient form for absorption membrane 15 is an array of loose bundles of thin walled tubes constructed of a suitable membrane material selected for its ability to reject salt passage and also mechanical strength to resist damage during scrubbing operations. For example, tubes of suitable polymer, such as nylon, cellulose acetate, and the like, having ½ mil wall thickness and 5 mils diameter can be used. Each such tube would pass through the permeator 13 emerging through a plastic or epoxy resin seal at the entrance and exit ports. The bodies of the plastic tubes can be contained within another rubber or flexible plastic tube comprising the outer shell of permeator 13 large enough in diameter to allow free raw fluid circulation around the outer surfaces of the small membrane tubes and such that the outer plastic tube can be gently deformed by rollers or other mechanisms to cause rubbing or jostling of the membrane tubes thereby rubbing any accumulated material from the surface of the tubes during operation.

Clearly many other configurations of the absorption permeator 13 are possible, each characterized by the combination of two fluid streams exposed to opposite sides of a membrane with a very small differential hydrostatic pressure across the membrane. One such alternative structure involves the use of small tubes of absorption membrane arrayed on a surface of a cylindrical drum which rotates continuously, dipping during part of its rotation into the raw fluid supply and emerging into open air during another portion of its rotation. During the exposure to air, high pressure jets of raw fluid can be arranged to impinge upon the membrane tubes to clean them and during the other portions of the rotation the tubes may encounter other cleaning mechanisms. In this alternative embodiment the intermediate fluid would be circulated through the axle of the cylindrical drum outward through a rotating seal through one end plate and inward at the other end plate through another rotating seal and out the other end of the axis.

One of the preferred intermediate fluids for use in the two-stage fluid treatment system of the present invention is an aqueous solution of magnesium sulfate. Other suitable intermediate fluids include ethylene glycol, solutions of sugars, glycerine, higher alcohols, and sodium chloride. The intermediate fluid should be selected to facilitate or improve the operation of the system. For example, the intermediate fluid may be selected to have lubricating properties so that the high pressure pumps of the reverse osmosis system have longer life or are otherwise improved in operation. Ethylene glycol is well known to improve the lubricating properties of water and ethylene glycol, or a similar material, can be a suitable intermediate solute for some systems, particularly systems employing gear pumps. In addition, the intermediate solute may be chosen to have biological properties which render the intermediate fluid an unsuitable medium for the growth of certain types of microorganisms which otherwise might cause problems in the system. Synthetic sea water, consisting of a mixture of salts approximating that present in normal sea water but of slightly higher concentration than normal sea water, may also be used as an intermediate fluid. The intermediate fluid is selected according to the following criteria:

a. It must not readily pass through either of the two semi-permeable membranes in the system,
b. It must develop sufficient osmotic pressure against the untreated fluid across the first membrane of the system to draw the desired fluid through the membrane and into solution in the intermediate fluid,
c. It must be readily soluble in the fluid which it is desired to purify,
d. It must not be corrosive, poisonous or otherwise inconvenient to use, and
e. It must not clog or react chemically with either of the two semi-permeable membranes.

Although not required, it is highly desirable to maintain a small hydrostatic pressure differential across membrane 15 in such a direction as to tend to force fluid in chamber 18 back into chamber 17, in order to assure that in the event of a leak in the seals or in membrane 15 no untreated fluid can pass from chamber 17 to chamber 18.

One of the significant advantages of the arrangement of the preferred embodiment illustrated by the drawing is that membrane 15 is accessible to washing and/or chemical treatment of the face of the membrane exposed to the raw fluid input to the four-terminal permeator 13. As previously explained, spray nozzles, brushes or agitators can be used to constantly clean the surface of the membrane 15 and also reduce concentration polarization due to accumulation of rejected raw water solutes near the membrane surface. Periodically, the membrane can, if desired, be exposed to a changed chemical environment so as to biologically sterilize the membrane surface, or to improve its selectivity, or to produce other desirable effects. Also the membrane 15 can readily be replaced entirely quite inexpensively and conveniently since no high pressure vessel is involved.

If desired, multiple permeators can be used in place of the single permeator 26 illustrated in the drawing. When multiple permeators are employed, they may be connected either in series, in parallel or various combinations thereof. Obviously, the size of the permeator or permeators may be varied — the limiting factor being the thickness of the tube sheet and the resulting greater pressure drop as the product fluid flows through the portion of the fibers embedded in the tube sheet. A typical 12 inch diameter by 7 foot permeator shell would contain 15 to 30 million hollow fibers with a surface area of 50,000 to 80,000 square feet. Such a permeator is capable of producing about 7,500 gallons per day of product water or sufficient water to fill the needs of about 50 people in a city.

Obviously, fluid discharged in conduit 28 may be subjected to further processing, e.g., another reverse osmosis system or an ion exchange demineralizer. Similarly, the fluid discharged in conduit 20 contains a concentration of minerals which can be further processed if desired.

Although desirable for many applications, it is not essential that the pressure in compartment 18 exceed that in compartment 17. The flow of fluid through membrane 15 could be augmented by operating the system with the pressure in compartment 17 somewhat higher than that in compartment 18 such that the applied pressure would aid direct osmosis, forcing the fluid through membrane 15. Provided only a low pressure differential exists, the rest of the system could operate exactly as described above with the intermediate fluid concentration serving to control the ratio of the pressure differentials across membrane 15 and the membrane in permeator 26. Thus, the pressure differential in permeator 13 can be varied slightly with the realization that membrane 15 is chosen mainly on the basis of its chemical discrimination properties rather than its ability to withstand the high hydrostatic pressure difference characteristically present in permeator 26.

From the foregoing, it will be seen that this invention is well adapted to obtain all of the ends and objects hereinabove set forth, together with other advantages which are obvious and which are inherent to the system. Membrane compaction is avoided by operating the first membrane at near zero pressure differential permitting the use of membranes incapable of supporting high pressures. The raw fluid input side of the first membrane is exposed for cleaning, scrubbing, chemical treatment or turbulent flow to relieve membrane fouling difficulties. Due to its accessibility, the first membrane can even be a disposable membrane which periodically is simply replaced with another membrane without the necessity to open any high pressure connections. Rapid circulation of the intermediate fluid facilitates osmosis through the first membrane. Filtration by the first membrane protects the second high pressure membrane from fouling. Thus, the second membrane is required mainly to remove the intermediate fluid since raw fluid minerals and biological material are mainly removed by the first low pressure membrane.

While primary emphasis has been placed on the purification of water from natural sources, e.g., industrial water, waste streams and particularly sea water, it will be understood that the system of the present invention has application to some rather complicated chemical separations which heretofore could not be satisfactorily processed by reverse osmosis purification systems due to membrane fouling.

As many possible embodiments may be made of the invention without departing from the scope thereof, it is to be understood that all matters herein set forth or depicted in the accompanying drawing are to be interpreted as illustrative and not in a limiting sense.

I claim:

1. A two-stage liquid treatment system consisting essentially of (a) a first stage which involves separating relatively pure liquid from untreated liquid input material by osmosis into solution in an intermediate fluid and (b) a second stage which involves the recovery of pure liquid substantially free of intermediate fluid by reverse osmosis, said system having:
   a permeator in the first stage having hollow fiber membranes for separating relatively pure liquid from untreated liquid input material by osmosis into solution in an intermediate fluid;
   means for contacting untreated liquid input material with the outside surface of the hollow fiber membranes in the permeator;
   means for periodically scrubbing the outside of the hollow fiber membranes in the permeator;
   means for passing intermediate fluid through the inside of the hollow fiber membranes of the permeator such that relatively pure liquid from the untreated liquid input material passes by osmosis through the hollow fiber membranes into solution in the intermediate fluid;
   at least one reverse osmosis permeator in the second stage having a membrane for recovering permeate of pure liquid substantially free of intermediate fluid by reverse osmosis, each reverse osmosis permeator having an input connection, a permeate connection and a reject output connection;
   pumping means adapted to deliver the intermediate fluid containing said relatively pure liquid under pressure to the input connection of each reverse osmosis permeator; and
   means for recycling intermediate fluid from the reject output connection of each reverse osmosis permeator to the permeator having hollow fiber membranes in the first stage of the system.

2. The two-stage liquid treatment system of claim 1 which further includes means for regulating the concentration of the intermediate fluid.

3. The two-stage liquid treatment system of claim 2 wherein the means for regulating the concentration of the intermediate fluid is responsive to pressure.

4. The two-stage liquid treatment system of claim 2 wherein the means for regulating the concentration of the intermediate fluid is responsive to total volume of the intermediate fluid in the system.

5. The two-stage liquid treatment system of claim 1 wherein the pumping means is a constant pressure pump.

6. The two-stage liquid treatment system of claim 1 in which the pumping means is a self-priming, positive displacement pump having a rotor in compression fit with a stator.

7. The two-stage liquid treatment system of claim 1 wherein a very small differential hydrostatic pressure exists across the hollow fiber membranes in the permeator of the first stage, the hydrostatic pressure being greater on the inside of the hollow fiber membranes than on the outside of said fiber membranes.

8. The two-stage liquid treatment system of claim 1 wherein the means for recycling intermediate fluid to the permeator of the first stage includes a positive displacement hydraulic motor.

9. The two-stage liquid treatment system of claim 8 wherein the positive displacement hydraulic motor is connected to the pumping means for the recovery of the energy of decompression.

10. The two-stage liquid treatment system of claim 1 wherein the intermediate fluid is magnesium sulfate.

11. The two-stage liquid treatment system of claim 1 wherein the intermediate fluid is sodium chloride.

12. The two-stage liquid treatment system of claim 1 wherein the means provided for scrubbing the outside of the hollow fiber membranes in the permeator cause the membranes to be gently deformed.

13. The two-stage liquid treatment system of claim 1 wherein the means provided for scrubbing the outside of the hollow fiber membranes in the permeator comprises pressure jets which cause fluid to be impinged upon the fiber membranes.

14. The two-stage liquid treatment system of claim 1 wherein the means provided for scrubbing the outside of the hollow fiber membranes in the permeator are means for mechanically scrubbing the membranes.

15. A two-stage liquid treatment system consisting essentially of (a) a first stage which involves separating relatively pure liquid from untreated liquid input material by osmosis into solution in an intermediate fluid and (b) a second stage which involves the recovery of pure liquid substantially free of intermediate fluid by reverse osmosis, said system having:
   a permeator in the first stage having hollow fiber membranes for separating relatively pure liquid from untreated liquid input material by osmosis into solution in an intermediate fluid;

means for contacting untreated liquid input material with the outside surface of the hollow fiber membranes in the permeator;

means for periodically scrubbing the outside of the hollow fiber membranes in the permeator;

means for passing intermediate fluid through the inside of the hollow fiber membranes of the permeator such that relatively pure liquid from the untreated liquid input material passes by osmosis through the hollow fiber membranes into solution in the intermediate fluid;

at least one reverse osmosis permeator in the second stage having a membrane for recovering permeate of pure liquid substantially free of intermediate fluid by reverse osmosis, each reverse osmosis permeator having an input connection, a permeate connection and a reject output connection;

pumping means comprising a self-priming, positive displacement pump having a rotor in compression fit with a stator and adapted to deliver the intermediate fluid containing said relatively pure liquid under pressure to the input connection of each reverse osmosis permeator; and means for recycling intermediate fluid from the reject output connection of each reverse osmosis permeator to the permeator having hollow fiber membranes in the first stage of the system.

16. The two-stage liquid treatment system of claim 15 wherein the means provided for scrubbing the outside of the hollow fiber membranes in the permeator cause the membranes to be gently deformed.

* * * * *